Inventors:
William E. Ishler
Eugene F. Apple
by
Their Attorney

3,124,539
METHOD FOR IMPROVING THE PERFORMANCE OF CALCIUM HALOPHOSPHATE PHOSPHORS
William E. Ishler, Lyndhurst, and Eugene F. Apple, Highland Heights, Ohio, assignors to General Electric Company, a corporation of New York
Filed Oct. 10, 1961, Ser. No. 144,155
2 Claims. (Cl. 252—301.4)

This invention relates to the manufacture and processing of calcium halophosphate phosphors which are widely used in fluorescent lamps and other devices.

Calcium halophosphate is represented by the formula $Ca_5(PO_4)_3X$ wherein X represents the halogens fluorine or chlorine or mixtures of the two. In the past, the formula has frequently been given as $3Ca_3(PO_4)_2 \cdot CaX_2$. The latter is identical with the former from the point of view of proportions of elements but it now appears that the former accurately represents the chemical structure. Antimony is provided as an activator to contribute a luminous emission band in the blue region, and manganese as a second activator to contribute an emission band in the orange-red region. The activated phosphor may be represented by the formula $Ca_5(PO_4)_3(Cl,F):Sb,Mn$. In general, the activator proportions fall in the range of 0.5% to 1.5% by weight for antimony and 0.5% to 3.0% by weight for manganese. Various qualities or color temperatures of white (cool, warm) may be obtained by varying the concentrations of the two activators, primarily that of manganese. For white phosphors the activator concentrations commonly used are 0.8 to 1.3% by weight for antimony and 1% to 2% by weight for manganese.

The object of our invention is to provide a method of treating calcium halophosphate phosphor to increase its brightness and its resistance to depreciation upon exposure to radiation.

We have discovered that when calcium halophosphate phosphors activated with antimony and manganese are heated to elevated temperatures in the range of 600 to 1200° C. and then very rapidly cooled or quenched to room temperature, changes occur in many of the crystalline properties. The principal properties to change are the emission spectra, the powder brightness under 2537 A. excitation, the diffuse reflectance spectra, and the X-ray diffraction intensities. These changes in properties taken together indicate a change in the crystalline structure dependent upon the cooling rate.

In particular, we have found that in calcium chlorophosphate represented by the formula $Ca_5(PO_4)_3Cl:Sb,Mn$, and in calcium chlorofluorophosphate represented by the formula $Ca_5(PO_4)_3(Cl,F):Sb,Mn$, quenching causes an increase in brightness, in general a shift in the manganese band spectral emission towards shorter wave lengths, that is towards the green, and an increase in the diffuse reflectance extending from about 300 A. into and throughout the visible region. Furthermore, we have discovered that the quenched phosphors are more resistant to various forms of irradiation than like phosphors slowly cooled. This result is quite surprising because one would normally expect the quickly cooled phosphors to be more highly strained and therefore to depreciate more rapidly upon exposure to irradiation.

The features of the invention which are believed to be novel are set forth with particularity in the appended claims. The invention itself however, together with further objects and advantages thereof, may best be understood by reference to the following description taken in conjunction with the accompanying drawing.

Figure 1:
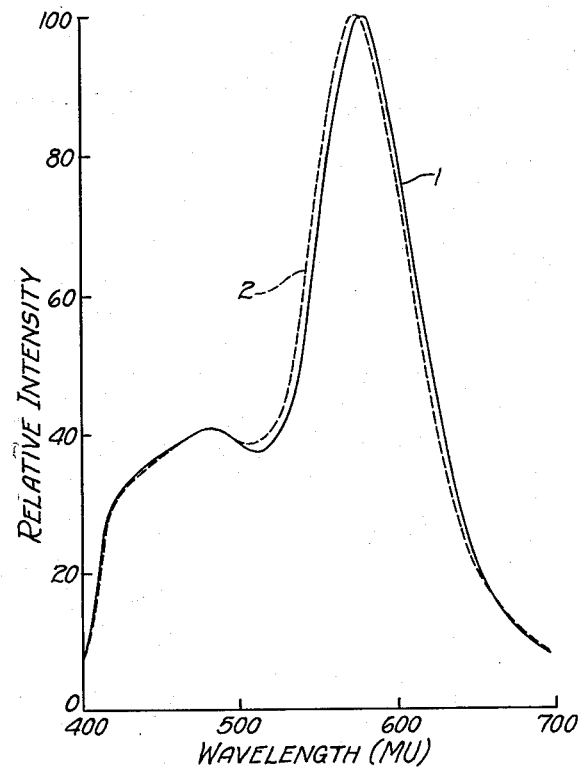
FIG. 1 is a comparative plot of the spectral distribution of a phosphor after slow cooling and after quenching.

In general, our invention is useful with calcium halophosphate phosphors activated with antimony and manganese irrespectively of the precise formulation or specific method of preparation. Conventional methods of preparation generally involve suitably mixing, as by ball milling, the phosphor ingredients consisting of $CaHPO_4$, $CaCO_3$, $CaCl_2$, $CaF_2$, $Sb_2O_3$, and $MnCO_3$. The batch is then fired, usually in covered trays, at a temperature in the range of 1100 to 1200° C for a period of time sufficient to effect formation of the phosphor, ordinarily 2 to 3 hours. After firing, the phosphor cake is broken up and ball milled if necessary to reduce the aggregates to the desired particle size.

In a typical cool white calcium halophosphate phosphor, the batch formulation may consist of 6 moles $CaHPO_4$, 2.67 moles $CaCO_3$, 0.22 mole $CaCl_2$, 0.88 mole $CaF_2$, 0.09 mole $Sb_2O_3$, and 0.17 mole $MnCO_3$. During the firing excesses of 0.12 atom antimony and 0.26 atom chlorine per mole of phosphor are volatilized. In a typical warm white calcium halophosphate phosphor, the batch formulation may consist of 6 moles $CaHPO_4$, 2.53 moles $CaCO_3$, 0.19 mole $CaCl_2$, 0.88 mole $CaF_2$, 0.09 mole $Sb_2O_3$, and 0.34 mole $MnCO_3$. During firing, excesses of 0.12 atoms antimony and 0.20 atom chlorine are volatilized.

Calcium chloride $CaCl_2$ is quite deliquescent. For this reason, in preparing the phosphor, it is sometimes desirable to replace it by ammonium chloride $NH_4Cl$. In such case, the atom concentration of calcium is kept constant by readjusting the proportion of calcium carbonate $CaCO_3$ to compensate. For optimum results, we prefer to apply our method to phosphors having the specific formulations described and claimed in copending application Serial No. 118,245, filed June 20, 1961, of George R. Gillooly et al., entitled Halophosphate Phosphors, and assigned to the same assignee as the present invention. The invention is also effective with calcium halophosphate phosphors modified by replacing a minor proportion of the calcium by some other element, for instance by replacing 1 to 2 atom percent of calcium by cadmium.

The procedure which we generally followed for quenching phosphors was to pack the phosphor sample into an annular quartz vessel which retained the phosphor in a layer about ¼" thick. The vessel was made by concentrically sealing together at their ends an outer quartz tube of approximately 25 millimeters diameter and an inner quartz tube of approximately 12 millimeters diameter and providing a loading tube communicating with the annular chamber between outer and inner tubes through which the phosphor charge is passed to load the chamber. This disposition of phosphor permits both rapid heating and rapid cooling throughout the specimen. After packing the phosphor sample in the chamber, a fired quartz-cloth plug was inserted in the loading tube in order to retain the sample but pass air or gases, and the sample was ready for firing.

Firings were made at various temperatures from 200° C. to 1225° C. for varying times from 25 minutes up to 3 hours. For fast cooling or quenching, the quartz vessel was plunged into a cool water bath. In slow cooling, the quartz vessel was simply left within the furnace and all power to the furnace was shut off so that the sample cooled slowly at the same rate as the furnace. The cooling rates were determined by embedding a chromel-alumel thermocouple encased in fine quartz tubing, in the phosphor sample. Typically, in quenching or fast cooling, the phosphor would cool from 1000° C. to 200° C. in approximately one minute; in slow cooling, the same drop in temperature takes several hours. Slow cooling approximates the normal production situation wherein a substantial quantity of phosphor is handled. We have also experimented with intermediate cooling rates wherein the quartz vessel was simply removed from the furnace and allowed to cool in air; typically the temperature of the phosphor would drop from about 1000° C. to 200° C. in about 10 minutes. Cooling at an intermediate rate results in phosphors having properties intermediate those obtained at the two extremes of quenching and slow cooling.

Our experiments have established that in calcium chlorophosphate or calcium chlorofluorophosphate activated with antimony and manganese, quenching or rapid cooling causes the spectral distribution of the manganese emission to shift towards shorter wave lengths, that is to shift from the yellow towards the green. In addition, an increase in plaque brightness was observed with the quenched sample; plaque brightness was measured by covering a plate with a layer of phosphor, irradiating the plate with 2537 A. radiation at constant intensity, and comparing the observed brightness in the visible range.

The spectral shift and increase in brightness occurs only with the chlorophosphate $Ca_5(PO_4)_3Cl$ and with the halophosphate $Ca_5(PO_4)_3(Cl,F)$. As the proportion of chlorine in the halophosphate is increased and that of fluorine is decreased, the properties came closer to those observed with the chlorophosphate, whereas with a higher proportion of fluorine, the properties observed came closer to those found with the fluorophosphate in which the manganese emission was not observed to shift with quenching. There is no hard and fast lower limit to the mole ratio of Cl to F at which the beneficial effect of quenching ceases, but the practical lower limit is approximately 0.05 mole Cl to 0.95 mole F.

In order to eliminate the possibility that the observed effects were the result of chemical changes such as volatilization of chlorine resulting from the additional firing operation, a sample of calcium chlorofluorophosphate which had previously been quenched and in which the spectral shift had been observed, was annealed, that is reheated once more and then cooled slowly. Its emission spectrum was found to be substantially identical with that of the original slowly cooled sample.

Figure 2:
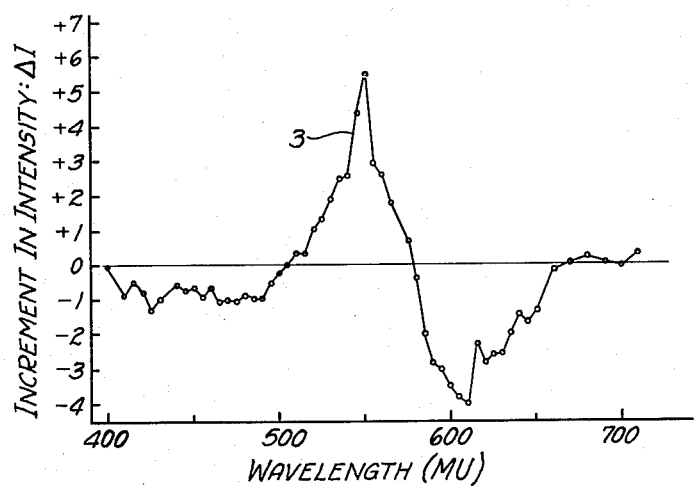
FIG. 2 is a plot of the increment in spectral response to show the spectral shift.

The observed results with typical halophosphate phosphors are graphically shown in FIG. 1 of the drawing. Solid line curve 1 is a plot of the relative intensity throughout the visible range observed with a calcium halophosphate phosphor activated with manganese and antimony and prepared with conventional slow cooling. Dotted line curve 2 shows the relative intensity with the same phosphor after quenching. Since the increase in relative intensity is only a few percent, for instance 1 to 3 percent, a better appreciation of the results is obtained by plotting the increment in intensity ΔI after normalizing the two curves to the same peak intensity. This is done by correcting the relative intensities throughout the quenched curve to show the same intensity at the manganese peak occurring in the region of 600 millimicrons, and then plotting as ΔI the values obtained by subtracting the corrected quenched intensity from the slow cooled intensity at any wave length. The result is shown by curve 3 in FIG. 2 wherein the dots are the values so calculated. The positive portion of the ΔI intensity curve is in the direction of shorter wave lengths (to the left) relative to the manganese emission peak; therefore it is indicative of a spectral shift towards shorter wave lengths and shows that the spectral distribution of the manganese emission has shifted from yellow or orange towards green.

The effects of quenching are observable when the phosphor is heated merely up to 600° C. and then quenched. In general however, in order to have useful results, the phosphor should be heated to the temperature range of 800 to 1200° C., and preferably 1100 to 1200° C. In quenching the phosphor, it should be cooled at least below 400° C. and of course it is most convenient to cool it substantially to room temperature.

We have also experimented with phosphors made without antimony activator, that is containing only the manganese activator. Since these phosphors do not respond to 2537 A., spectral measurements were made under cathode ray excitation. With these phosphors, we did observe a shift in the manganese emission in most samples; in a few samples, the shift was barely detectable, if present at all. Thus the shift in manganese emission on quenching is observed in phosphors with or without antimony present.

We have also observed the diffuse reflectance to change, the quenched samples have higher reflectance, particularly in the region from 3000 to 3500 A. No appreciable change in the 2537 A. absorption was observed, nor were the changes in reflectance found at longer wave lengths linearly related to the changes observed in plaque brightness.

A very surprising result of the quenching treatment in accordance with our invention is the observed increase in resistance to depreciation under irradiation. We expected the quickly cooled or quenched phosphors to be more highly strained and therefore to depreciate more rapidly upon exposure to irradiation such as cathode rays, or 1850 A. ultraviolet radiation such as is present in fluorescent lamps. Surprisingly, the quenched samples are actually more resistant to such irradiation than the slowly cooled samples. For instance upon exposure in vacuum to spark irradiation from a "Tesla coil" for one minute, the diffuse reflectance of a quenched phosphor decreased only between ½ and ⅔ as much as that of a corresponding slowly cooled phosphor. Upon exposure to 1850 A. ultraviolet radiation for one hour, the brightness of the quenched phosphor was 96.7% of its brightness before exposure, while that of the slowly cooled phosphor was only 92.7% of its original brightness.

Although, for the purpose of our tests, we have for the most part reheated previously prepared phosphors and then quenched them, quenching is equally effective if it is performed as the last step in the firing of the phosphor. Of course, in quantity production, the problem arises of finding a practical means to quench a large quantity of phosphor. Fortunately, we have found a simple solution to the problem which consists in merely dumping the mass of phosphor into cool pure water, preferably distilled or deionized. After quenching, the phosphor is reheated to a temperature below 200° C. in order to dry it out thoroughly.

There is however a more difficult problem in the use of our quenched phosphors in fluorescent lamp manufacturing. The customary practice in lamp making is to coat the lamp envelope or tube internally with a suspension of phosphor in an organic binder, after which the phosphor coating is dried and then lehred to decompose the binder and drive off the organic constituents. As previously mentioned, the effects of quenching are reversible, that is reheating and slow cooling destroys the effects. Therefore in lehring a fluorescent lamp utilizing a quenched calcium chloro- or halophosphate phosphor in accordance with our invention, lehring at high temperatures exceeding 600° C. must be avoided. In practice, temperatures above 400° C. should be avoided and this entails that a binder must be provided which can be completely decomposed and driven off at a temperature below 400° C. Alternatively, the lamp may be phosphor coated without using a binder, for instance, by electrostatic deposition of the phosphor wherein the phosphor particles are passed through a zone in which they acquire an electric charge and an electric field is then used to deposit them on the envelope wall.

The beneficial results obtained by the quenching treatment of calcium chlorophosphate and calcium chlorofluorophosphate are not dependent upon any theory which may be proposed in explanation. However we believe that the following may be helpful to explain the positive results obtained with calcium chlorophosphate or chlorofluorophosphate and the negative results obtained with calcium fluorophosphate. It is thought that the only major difference between the location of atoms in calcium chlorophosphate and fluorophosphate is in the positions of Cl (000,001/2) and F (001/4, 003/4). We propose that the effect of quenching where chlorine atoms are present, is to randomize the chlorine atoms over both the normal chlorine sites and the normal fluorine sites, thus effecting a change in luminescence and structure toward those of calcium fluorophosphate. X-ray diffraction data thus far obtained are consistent with the occurrence of such a change in structure on rapid cooling.

The examples and details of processing of phosphors in accordance with our invention are intended as illustrative and the scope of the invention is to be determined by the appended claims.

What we claim as new and desire to secure by Letters Patent of the United States is:

1. The method of treating a calcium halophosphate phosphor activated with antimony and manganese and having the approximate formula $Ca_5(PO_4)_3(Cl,F):Sb,Mn$ wherein Cl is not less than 0.05 mole and F is not more than 0.95 mole and wherein Sb is in the range of 0.5% to 1.5% by weight and Mn is in the range of 0.5% to 3.0% by weight, in order to increase its brightness and resistance to depreciation under irradiation, which comprises heating the phosphor into the temperature range of 800° C. to 1200° C., and then quenching it to a temperature less than 400° C. in not more than approximately 1 minute.

2. The method defined in claim 1 wherein the phosphor is heated into the temperature range of 1100° C. to 1200° C. and then quenched substantially to room temperature.

References Cited in the file of this patent

UNITED STATES PATENTS 2,976,249      Rimbach et al. _____ Mar. 21, 1961